US010086300B1

(12) United States Patent
Suttell

(10) Patent No.: US 10,086,300 B1
(45) Date of Patent: Oct. 2, 2018

(54) COMBINED TRANSLATIONAL AND ROTATIONAL MOTION SIMULATOR

(71) Applicant: Nicholas G. Suttell, Tallahassee, FL (US)

(72) Inventor: Nicholas G. Suttell, Tallahassee, FL (US)

(*) Notice: Subject to any disclaimer, the term of this patent is extended or adjusted under 35 U.S.C. 154(b) by 0 days.

(21) Appl. No.: 15/474,776

(22) Filed: Mar. 30, 2017

Related U.S. Application Data

(60) Provisional application No. 62/315,111, filed on Mar. 30, 2016.

(51) Int. Cl.
*A63G 31/16* (2006.01)
*G06T 19/00* (2011.01)

(52) U.S. Cl.
CPC .......... *A63G 31/16* (2013.01); *G06T 19/003* (2013.01)

(58) Field of Classification Search
CPC .......... G09B 9/02; A63G 31/16; A63G 31/00; G06T 19/003
See application file for complete search history.

(56) References Cited

U.S. PATENT DOCUMENTS

| | | | |
|---|---|---|---|
| 5,509,631 A | 4/1996 | DeSalvo | |
| 5,558,582 A | 9/1996 | Swensen | |
| 5,759,107 A * | 6/1998 | Nagel | A63G 31/16 434/55 |
| 6,007,338 A | 12/1999 | DiNunzio | |
| 8,968,109 B2 | 3/2015 | Stoker | |
| 9,011,259 B2 | 4/2015 | Schmidt | |
| 9,873,058 B2 * | 1/2018 | Magrath, III | A63G 25/00 |
| 2007/0111170 A1 * | 5/2007 | Lefton | A63G 31/16 434/29 |

OTHER PUBLICATIONS

Undated publication by NASA describing its Vertical Motion Simulator at Ames Research Center.

* cited by examiner

*Primary Examiner* — Michael Dennis
(74) *Attorney, Agent, or Firm* — Robert C. Brown

(57) ABSTRACT

A versatile translational and rotational motion simulator comprising a first apparatus to translate a user in a first linear direction; a second apparatus to translate the user in a second linear direction; a third apparatus to translate the user in a third linear direction; a fourth apparatus disposed on the third apparatus to support the user throughout the first, second, and third linear translations; a gimbal assembly disposed on the fourth apparatus and including a positional tracking sensor and/or reference device to track the position of a user's head; a virtual reality device to create a virtual reality scene within the mind of the user; a sound system to create an auditory sensation within the mind of the user; microelectronics; and a programmable controller, the simulator being operable to translate the user forward and backward in the first, second, and third linear directions and the first, second, and third rotational directions simultaneously.

17 Claims, 16 Drawing Sheets

α and β Component Control
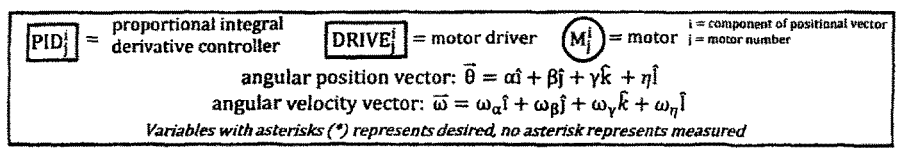
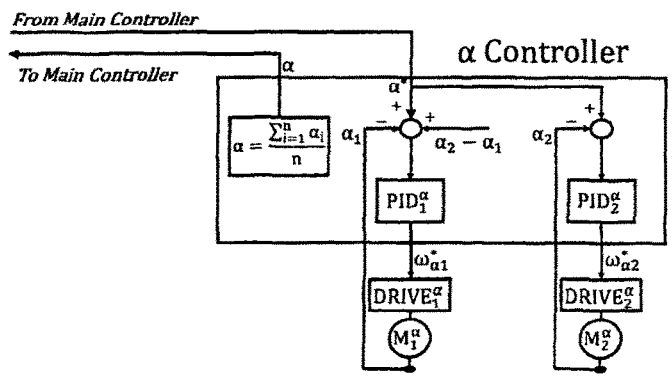
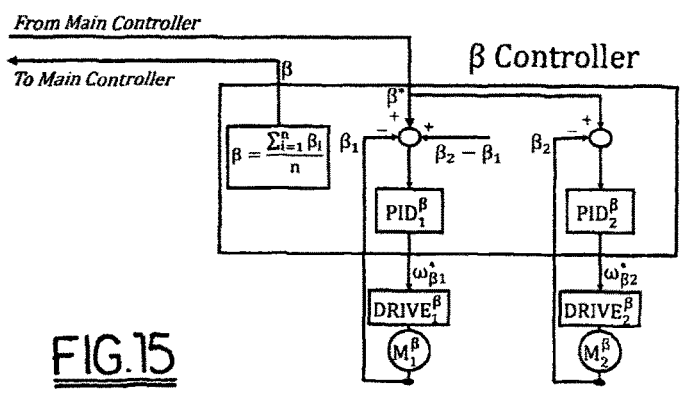
FIG.15

γ and η Component Control
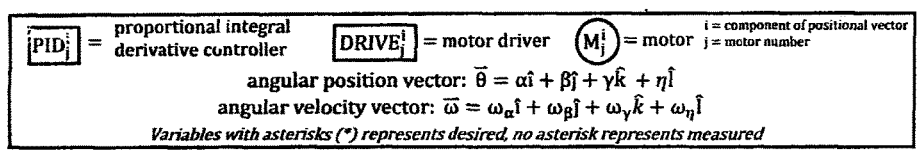
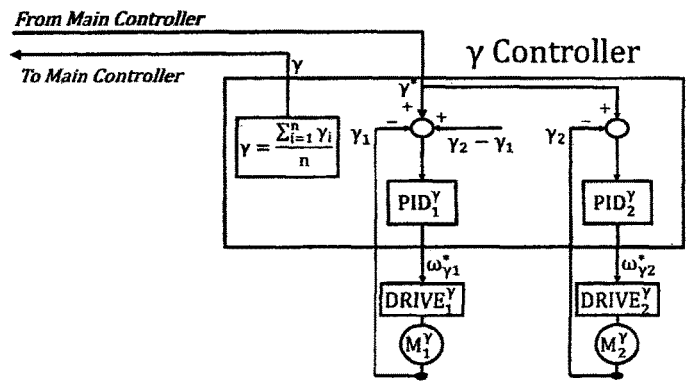
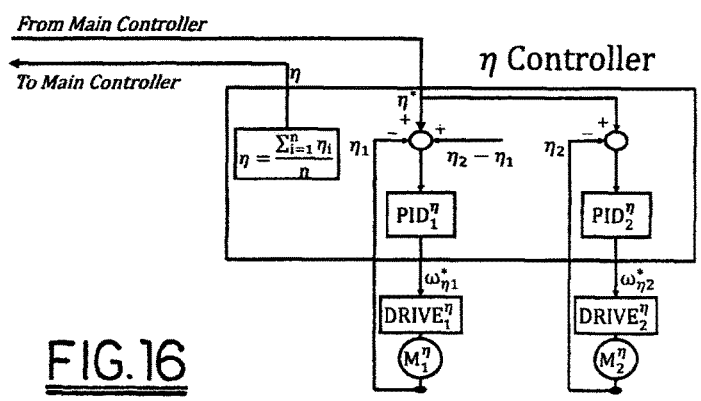
FIG. 16

COMBINED TRANSLATIONAL AND ROTATIONAL MOTION SIMULATOR

RELATIONSHIP TO OTHER APPLICATIONS AND PATENTS

The present application draws priority from Provisional U.S. Patent Application Ser. No. 62/315,111, filed Mar. 30, 2016.

FIELD OF THE INVENTION

This disclosure relates generally to virtual reality; more specifically, it relates to an integrated system for generating and combining real translational and rotational motion of a simulator user and virtual scenes perceived by the simulator user.

BACKGROUND OF THE INVENTION

Prior art related to devices that move people, including rollercoasters and other amusement rides, perform accelerations and velocities in specific directions under specific G-forces to produce an exciting and euphoric sensation within a user. Other people movers such as elevators have the sole purpose of transporting people vertically from one location to another. Motion simulators for training also move people in preparation for dangerous, real world tasks.

Some of these systems utilize linear propulsion or linear lift systems to produce such accelerations. These linear motion systems can incorporate a variety of apparatus including, but not limited to, rotary motors with pulleys and steel cables, hydraulic motors, linear induction motors, linear synchronous motors or any other suitable linear actuator.

The recent advancement of virtual reality (VR) technology has greatly increased interest in the entertainment industry. A plethora of motion systems have been developed to accompany the new wave of interest. Most of these real motion systems are small-scale and typically utilize hydraulic motors and/or cylinders to induce a sensation of motion by producing small accelerations.

The use of VR on riders of actual rollercoasters is a relatively new idea. Six Flags has already implemented their own VR rollercoaster experience at several parks where the riders wear a VR headset whilst on the ride. Additional VR experiences are now, or soon will become, available at amusement parks around the world.

Being able to provide new experiences for people to enjoy and share will always be of interest as well as a valuable industry. Virtual reality headsets are already capable of providing what is known as "presence" which is the perception of being physically present in a non-physical world. The problem with virtual reality today is that developing experiences involving motion of the user is extremely difficult to do. The majority of VR content currently being developed consists of sitting or standing experiences or walking around a confined space only. Because VR technology has seen so much improvement, motion simulators need to catch up in order to maintain the feeling of presence within the user during motion. Conventional motion simulators lack the fidelity required for a user to maintain presence, and the disconnect between the virtual motion and real motion confuses the body's vestibular system causing nausea. The closer a motion simulator can get to matching the real accelerations with the virtual accelerations (remaining within biological tolerances), the more pleasing the experience will be. Although a conventional wooden or steel rollercoaster can be useful and is advantageous for certain applications, it suffers from several drawbacks. A conventional roller coaster may be defined as an amusement park attract on that consists of a fixed track with many tight turns and steep slopes, on which people ride in small fast cars.

One drawback is that the ride is static in its mechanical configuration. In other words, the path of such a conventional rollercoaster is constant because it requires deconstructing components that are extremely difficult to fabricate. Additionally, there is no location on the ride's path where the rider can experience a different acceleration from one ride to the next. This is, of course, neglecting weather and frictional effects due to differences in weight of the passenger car from ride to ride.

Another drawback is that the design process requires a lot of planning. It can require up to 1,500 hours to design a rollercoaster, plus two to six weeks to install and test it before it can be made available to the public.

Another drawback is that manufacturing techniques are very time-consuming and expensive. During the process of manufacturing rollercoasters, straight pieces of steel are heated and then permanently formed into desired shapes. The manufactured shapes of the rails need to be accurate to within a tenth of a millimeter of their designed shapes, and significant metal fatigue can result from the process.

To vary the perceived ride that a user experiences, it has been suggested to combine and map the virtual motion travel, provided via individual VR headsets worn by system users, with actual physical travel on a conventional rollercoaster. While such a system can minimize capital outlay by utilizing an existing physical rollercoaster, a drawback is that the configuration of the ride is fixed and limited to the three-dimensional configuration of the rollercoaster track itself.

It has been suggested to use motion simulators in place of conventional rollercoasters. However, conventional motion simulators, presently used for combat and space transportation or for other difficult tasks that cannot be safely replicated in the real world, lack the required fidelity to reality limiting its use to only a small handful of experiences.

In the prior art, the NASA Ames Research Center at Moffett Field, Calif., includes a Vertical Motion Simulator (VMS) wherein the motion base features six degrees of freedom, meaning that a cab, with the pilot inside, can be driven in the six ways that an aircraft or space capsule is capable of moving. This includes the three translational degrees of freedom (vertical, lateral, and longitudinal) and the three rotational degrees of freedom (pitch, roll, and yaw). Providing the vertical degree of freedom is a vertical structure including a platform, which spans the 70-foot height of the building and supports the mechanisms for the remaining degrees of freedom. Supporting the platform are two columns that extend into 75-foot deep shafts. Guides on either end and on one side of the platform keep it aligned. Moving the 70-ton weight of the platform and its load quickly is made possible by an equilibrator that pressurizes the two supporting columns with nitrogen, neutralizing the immense load. Eight 150-horsepower motors drive the columns, accelerating the platform vertically up to 22 feet/second/second, or almost ¾ g. Providing lateral movement is a lateral carriage, which can translate 40 feet and is driven by four 40-horsepower electric motors. Longitudinal movement is provided by a longitudinal carriage, with a range of 8 feet, driven by telescoping hydraulic actuators.

Like the longitudinal carriage, the three rotational degrees of freedom are driven hydraulically. A rotating center post provides yaw movements, and pitch and roll hydraulic actuators provide pitch and roll movements.

Two catenaries, which attach to the lateral carriage, protect the many electric, electronic, and hydraulic lines that connect a moving cab to the rest of the simulator. Hinges in the catenaries make them flexible, allowing them to move as the cab moves.

Out-the-window (OTW) graphics provide computer-generated images that simulate the outside world for a pilot. The VMS maintains two image generators, one with five channels and one with six. Each channel corresponds to the image displayed in a single window. The image generators are capable of independent eyepoints; in other words, they can display the scene from different positions simultaneously. This enables the pilot and copilot to view the scene accurately from their slightly different positions.

A shortcoming of this system is that each of the rotational degrees of freedom is only partial, unlike a true gimbal system wherein each gimbal is capable of the full 360° of rotation about its own axis.

U.S. Pat. No. 5,509,631, issued Apr. 23, 1996 to DeSalvo; U.S. Pat. No. 5,558,582 issued Sep. 24, 1996 to Swensen; U.S. Pat. No. 6,007,338 issued Dec. 28, 1999 to DiNunzio; U.S. Pat. No. 8,968,109, issued Mar. 3, 2015 to Stoker; and U.S. Pat. No. 9,011,259, issued Apr. 21, 2015 to Schmidt all disclose some elements similar to that of the present invention, but they do not anticipate the present invention nor taken together render the present invention obvious to one of ordinary skill in the art.

What is needed in the art is an improved real or physical motion system for simulating, in full scale and high fidelity, the actual path in three dimensional space of any physically moving object, operable without the use of rails fixed in space to describe the actual path, and programmable to provide any desired physical path at any velocity and variation thereof through a three-dimensional space.

What is further needed is such a system wherein a user may be subjected to any physical orientation in such a three-dimensional space while traveling on such a physical path, and in which the physical path may be continuous or discontinuous What is still further needed is such a system wherein a user is equipped with a virtual reality apparatus wherein a virtual path viewed by the user is synchronized with the user's physical path to produce a sensation in the user of a desired travel experience.

It is the object of the present invention to create in a user's mind a realistic sensation of virtual travel through a three-dimensional scene.

It is a further object of the present invention to move a user along a physical path corresponding to a virtual travel path by providing accurate accelerations with a high degree of fidelity drastically improving the quality of the experience over any other system of similar purpose.

SUMMARY OF THE INVENTION

Briefly described, in accordance with one aspect of the present invention, the path of real motion is completely dynamic. In this respect, the real motion path can be changed at any time, in any dimension, in an infinite number of ways, simply by altering the enabling software and motion controls. This dynamic freedom is possible due to the arrangement of the linear and rotary motors.

In one embodiment, each degree of freedom in the apparatus is precisely controlled and programmable to copy a component of the actual motion of a large number of real world experiences including, but not limited to, riding rollercoasters; travelling on land, sea, air, or in space; and experiencing extreme sports, all preferably at a 1:1 ratio and with a high degree of fidelity. Further, new or imagined events can be simulated that have never been experienced, and indeed may be impossible to experience in the real world, e.g., landing from space on Mercury or storming a medieval castle.

In another embodiment, the experiences can be random or interactive, letting a user select the outcome of the experience or manipulate the virtual environment.

In another embodiment, the system can be operated like a conventional movie theater where a plurality of persons share a common real world ride but experience individual virtual reality rides. Also, in a movie theater, people return repeatedly to enjoy new experiences as they become available.

A versatile translational and rotational motion simulator in accordance with the present invention comprises a first apparatus operable to translate a user in a first linear direction; a second apparatus disposed on the first apparatus and operable to translate the user in a second linear direction orthogonal to the first linear direction; a third apparatus disposed on the second apparatus operable to translate the user in a third linear direction orthogonal to the first and second linear directions; a fourth apparatus disposed on the third apparatus operable to support the user throughout the first, second, and third linear translations, and together with the first, second, and third apparatus defining a programmable linear motion assembly. The first, second, and third apparatus are independently directable in speed, acceleration, and direction along their respective orthogonal axes. Preferably, deceleration in any of the three directions is assisted by regenerative braking.

A versatile translational and rotational motion simulator in accordance with the present invention further comprises a first motorized gimbal disposed on the fourth apparatus and having a first axis of rotation about which the first gimbal is rotatable in a first direction of rotation, either forward or backward; a second motorized gimbal disposed on the first gimbal and having a second axis of rotation intersecting the first axis of rotation about which the second gimbal is rotatable in a second direction of rotation, either forward or backward; and a third motorized gimbal disposed on the second gimbal and having a third axis of rotation intersecting the first and second axes of rotation about which the third gimbal is rotatable in a third direction of rotation, either forward or backward. The first, second, and third gimbals taken together define a gimbal assembly disposed on the fourth apparatus.

Optionally, a plurality of such gimbal assemblies may be arrayed on the fourth apparatus to permit a like number of hybrid reality trips to be enjoyed simultaneously by a plurality of users.

Optionally, a fourth motorized gimbal may be included in a gimbal assembly to prevent "gimbal lock", as is well known in the gimbal arts. Gimbal lock is the loss of one degree of freedom when the axes of rotation of two gimbals of a three-gimbal assembly are driven into a parallel configuration. In this configuration, there is no gimbal to accommodate rotation along one axis. As the axis of rotation of the two gimbals come into alignment, the assembly experiences a discontinuous motion (gimbal lock). Having a fourth gimbal can avoid gimbal lock by intelligently controlling it so that at most only two gimbal axes of rotation line up. A four-gimbal assembly can still experience gimbal lock when all four gimbals align on two axes of rotation (two sets of gimbals in parallel). This configuration neglects one axis of rotation. As long as no more than two gimbal axes of rotation are parallel, the gimbal assembly will not lock, and continuous motion will always be possible. In the case of a four-gimbal assembly, the entire simulator system will have seven degrees of freedom instead of six.

The first, second, and third gimbals are independently directable in speed, acceleration, and direction about their respective rotational axes. Preferably, rotary deceleration of any of the three gimbals is assisted by regenerative braking.

Still further, at least one user position is disposed within the third gimbal for occupancy by the user, and at least one positional tracking sensor and/or reference device are disposed within the third gimbal operable to track the position of the user's head and/or other limbs.

Still further, a fifth apparatus comprising a virtual reality device is disposed within the third gimbal and is wearable by the user and is operable to create a virtual reality scene within the mind of the user.

A sixth apparatus, disposed within the third gimbal and wearable by the user, is operable to create an auditory sensation within the mind of the user.

Still further, a seventh apparatus disposed within the third gimbal and containing microelectronics is operable to supply graphical processing power to the fifth apparatus and auditory amplification to the sixth apparatus, and together with the at least one positional tracking sensor and the fifth and sixth apparatus define a virtual motion assembly.

One or more programmable controllers are operationally connected to the first apparatus, the second apparatus, the third apparatus, the first motorized gimbal, the second motorized gimbal, the third motorized gimbal, the optional fourth motorized gimbal, the fifth apparatus, and the seventh apparatus; wherein the simulator is operable to translate the user forward or backward in the first, second, and third linear directions and the first, second, and third rotational directions simultaneously and to provide virtual visual and audio stimulation in sync with the produced motion.

BRIEF DESCRIPTION OF THE DRAWINGS

The drawings are not necessarily to scale; emphasis instead generally being placed upon illustrating the principles of the invention. In the drawings, like numerals are used to indicate like parts throughout the various views. The features described herein can be better understood with reference to the drawings described below wherein:

FIG. 15 is a sub-control scheme that coordinates with the main control scheme shown in FIG. 13 for controlling the $\alpha$ and $\beta$ components of the simulator; and FIG. 16 is a sub-control scheme that coordinates with the main control scheme shown in FIG. 13 for controlling the $\gamma$ and $\eta$ components of the simulator.

DETAILED DESCRIPTION OF THE INVENTION

Referring to FIGS. 1 through 16, a versatile translational and rotational motion simulator in accordance with the present invention is operable to create a virtual reality experience in the mind of a user that is synchronized with a real motion experience of the body of the user. The real motion portion of the invention comprises 1:1 high fidelity real motion along three linear Cartesian axes and around three rotational axes simultaneously. Such 1:1 real motion is defined as being physically identical to the apparent translations and accelerations inherent in virtual motion scenes presented to the user.

Figure 1:
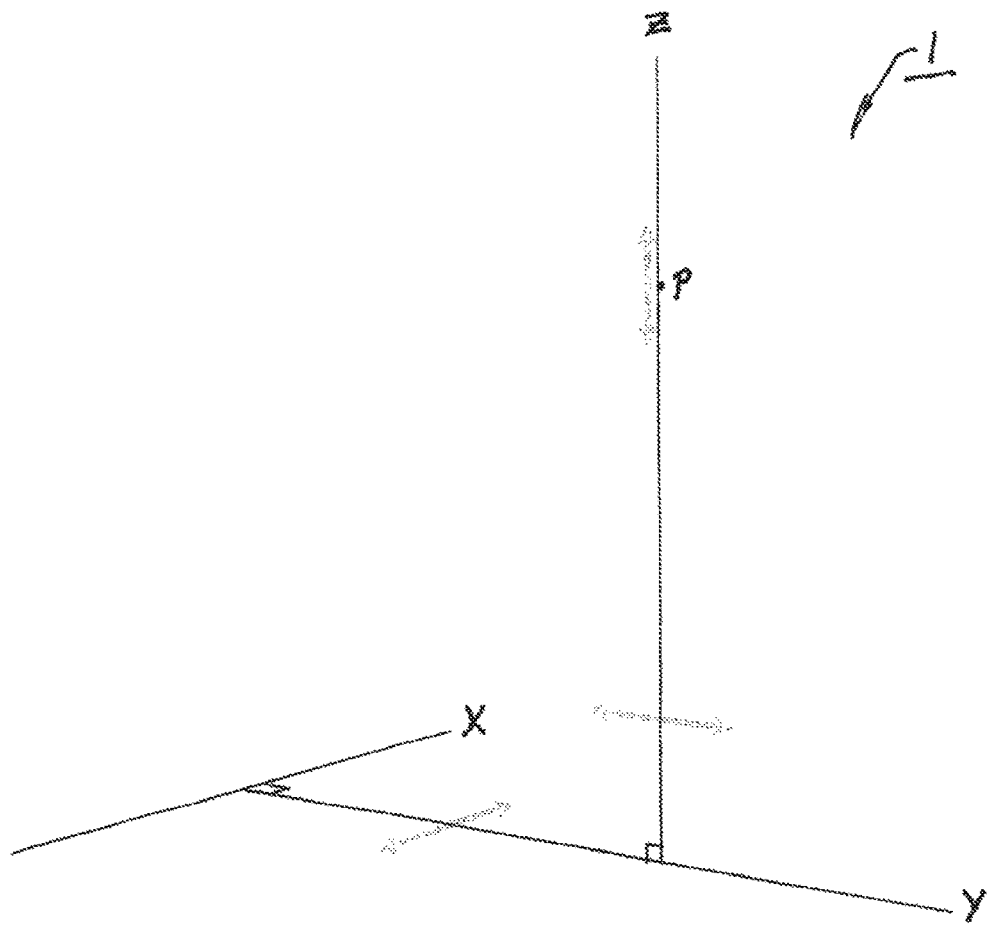
FIG. 1 is a schematic drawing showing three linear Cartesian axes useful in designing and implementing a simulator in accordance with the present invention.
Figure 2:
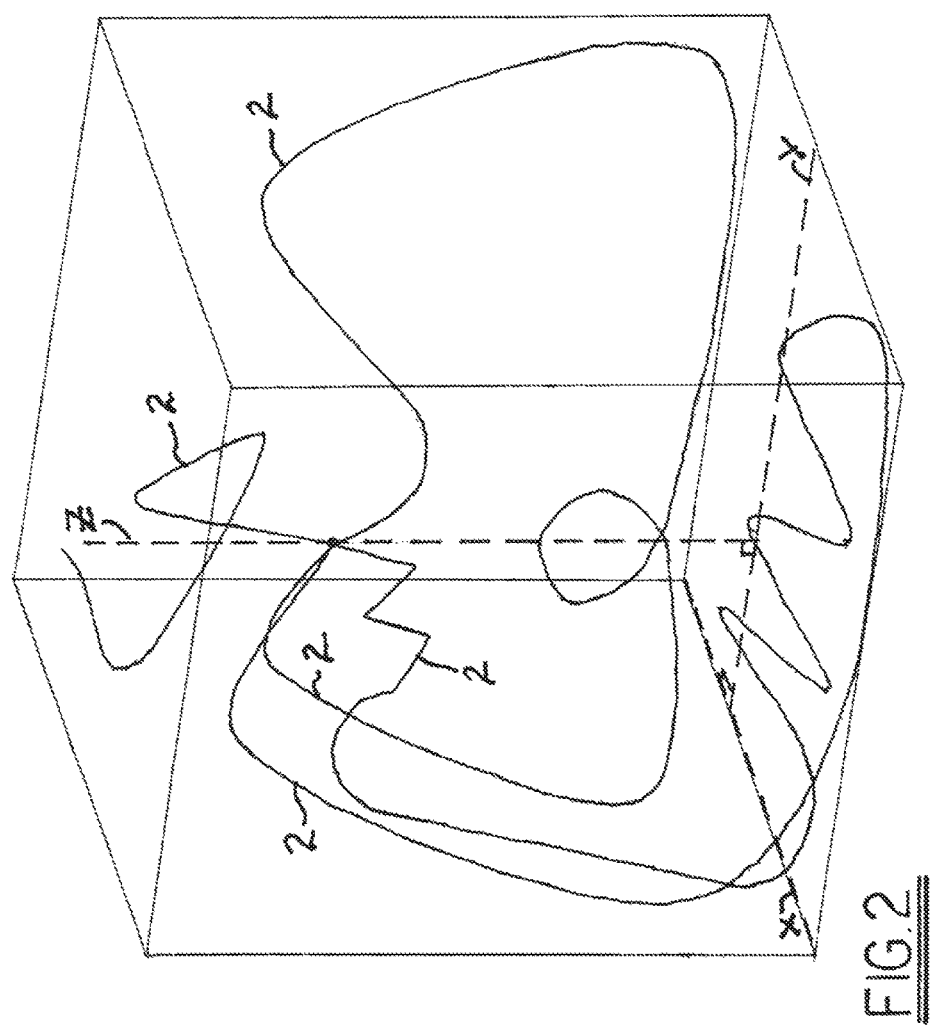
FIG. 2 is a schematic drawing of a three-dimensional space wherein a simulator in accordance with the present invention can translate a user along any one of an infinite number of exemplary paths.

Referring to FIGS. 1 and 2, three orthogonal linear axes X, Y, and Z are shown in real space 1. Point P is translatable directly along the Z axis, which entire axis is translatable directly along the Y axis, which entire axis is translatable directly along the X axis. It is seen that by combining simultaneous motion along all three axes of translation, Point P can be moved along any one of an infinite number of continuous or discontinuous paths through real space. Exemplary paths 2 are shown in FIG. 2.

Figure 3:
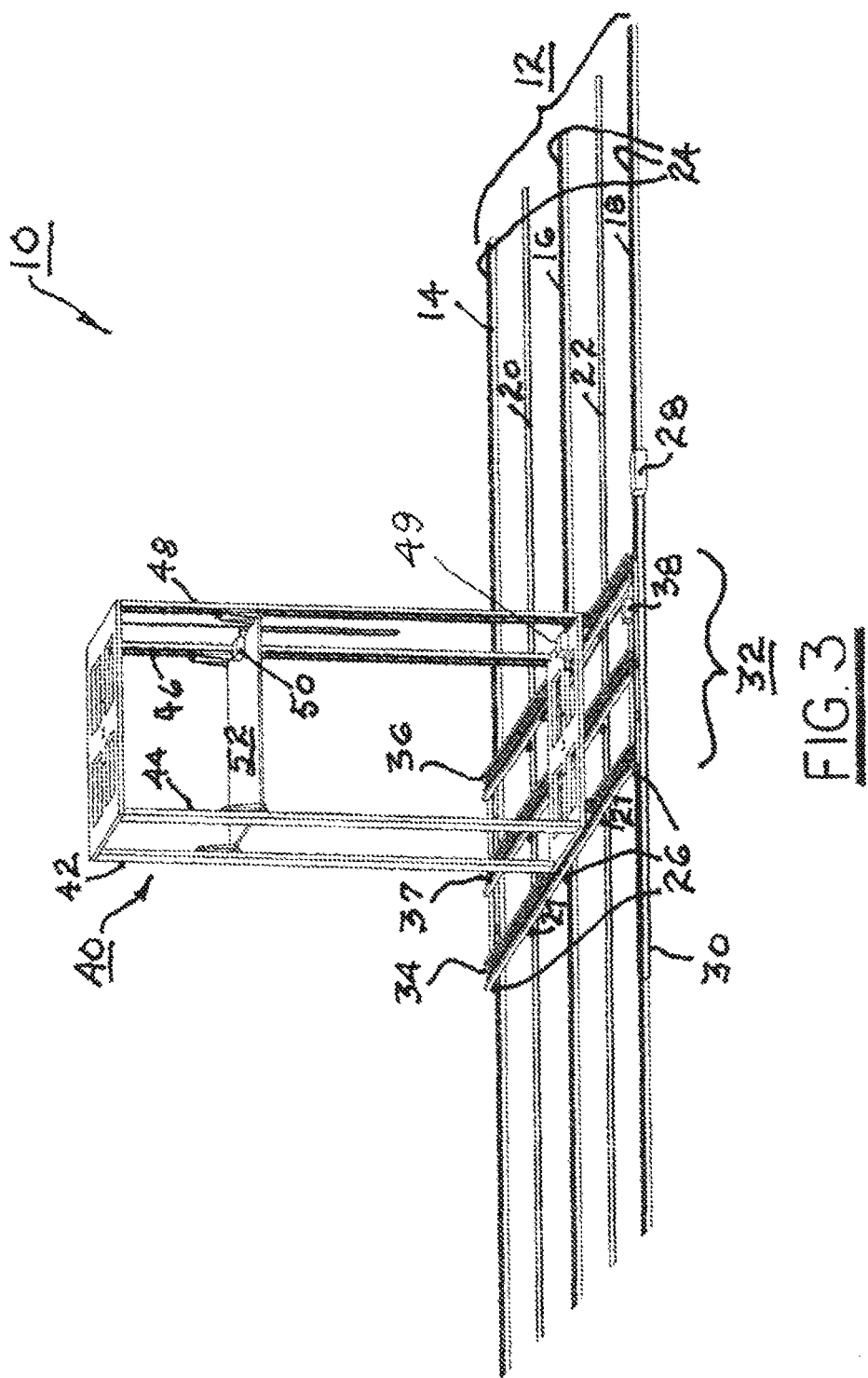
FIG. 3 is a schematic elevational view of a translating portion of a simulator in accordance with the present invention.

Referring now to FIG. 3, an exemplary electromechanical system 10 is shown for moving an apparatus along any of the infinite number of paths 2 just described in real space 1. The motive force for translation used in the currently-preferred example is provided by one or more linear synchronized motors (LSMs) and/or linear induction motors (LIMs), although the invention fully comprehends use of other motive devices, including but not limited to rotary motors with pulleys and steel cables and hydraulic motors and pistons.

Note: With respect to linear motors, there are two different ways to arrange the components. For example, the stator (primary) can be either the stationary component or the moving component.

A stationary stator arrangement (primary) is known in the art as a "long stator" design (and connected to the electrical grid) because the track comprises the stator in this situation and is longer than the car (the moving part).

A moving stator arrangement is known in the art as a "short stator" design (located on the car with on-board electrical power), and the track comprises the rotor.

The present invention may employ either type of stator arrangement or may use a combination of LIMs and LSMs since one can be less expensive whereas the other can be lighter and more efficient.

System 10 comprises a first horizontally-operable structure 12 (first apparatus) having, e.g., three first LSMs 14,16,18 operable in parallel to move overhead apparatus along the Y axis direction shown in FIGS. 1 and 2, and, e.g., two guide rails 20,22. Each first LSM 14,16,18 includes a linear primary 24 and at least one secondary 26. A guide car 27 is operable on guide rails 20 and 22. A first power distribution device 28 provides power to each first LSM and transfers power to the rest of the simulator system via cable chain 30 in known fashion.

System 10 further comprises a second horizontally-operable structure 32 (second apparatus) having, e.g., three second LSM/LIMs 34,36,37 operable in parallel to move overhead apparatus along the X axis direction as shown in FIGS. 1 and 2. Optionally, a guide rail (not shown) may be included in horizontal structure 32. Each second LSM includes at least one primary and at least one secondary. The secondaries extend lengthwise and move in synchrony along the primaries. A second power distribution device 38 receives power from first power distribution device 28 and provides power to each second LSM and transfers power to the remaining simulator system via a cable chain in known fashion.

System 10 further comprises a third vertically-operable and rectangular structure 40 (third apparatus) having preferably at least four, but could theoretically have just one, LSM/LIMs 42,44,46,48 disposed at the four corners of structure 40 and operable in parallel along the Z axis direction shown in FIGS. 1 and 2. Each third LSM/LIM includes at least one primary and at least one secondary. The secondaries move in synchrony along the primaries. A third power distribution device 49 receives power from second power distribution device 38 and provides power to each vertically-operable LSM and transfers power to the remaining simulator system via a cable chain in known fashion. A fourth power distribution device 50 receives power from third power distribution device 49 and provides power to the gimbal array and VR devices described below.

LSM/LIMs 42,44,46,48 support a platform 52 (fourth apparatus) for vertical motion within third structure 40. It will now be seen that structure 10 as described thus far is capable of moving platform 52 to any desired position within real space 1 (FIG. 2).

Figure 4:
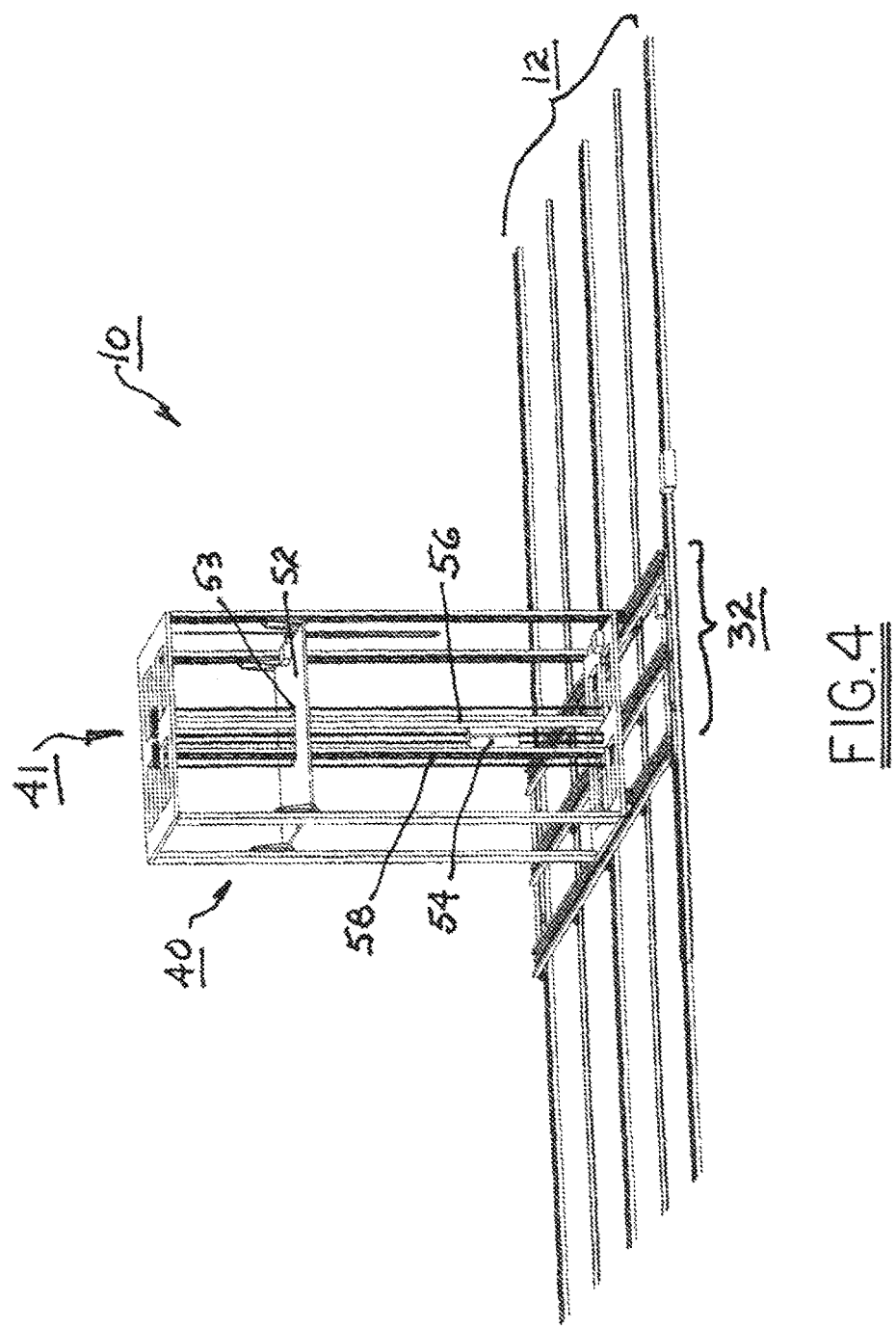
FIG. 4 a schematic elevational view of the translating apparatus shown in FIG. 3, showing the addition of a counterweight attached to the platform portion of the translating apparatus and passing through an opening in the center thereof.

Referring now to FIG. 4, structures 12,32, and 40 define a first electromechanical subsystem 41 for rectilinear motion of a point P along three orthogonal translational axes in three-dimensional space. In a currently preferred embodiment, an optional counterweight 54, hung via a cable on a pulley at the top of structure 40, is passed through an opening 53 at the center of platform 52, the cable being connected at its free end to platform 52. Counterweight 54 offsets the weight of, and load on, platform 52 which decreases the response time and energy required for vertical movement of platform 52. Optionally, additional LSM/LIMs 56,58 may be provided through opening 53, operable in parallel with LSM/LIMs 42,44,46,48 to increase the vertical motive force of simulator 10.

Figure 5:
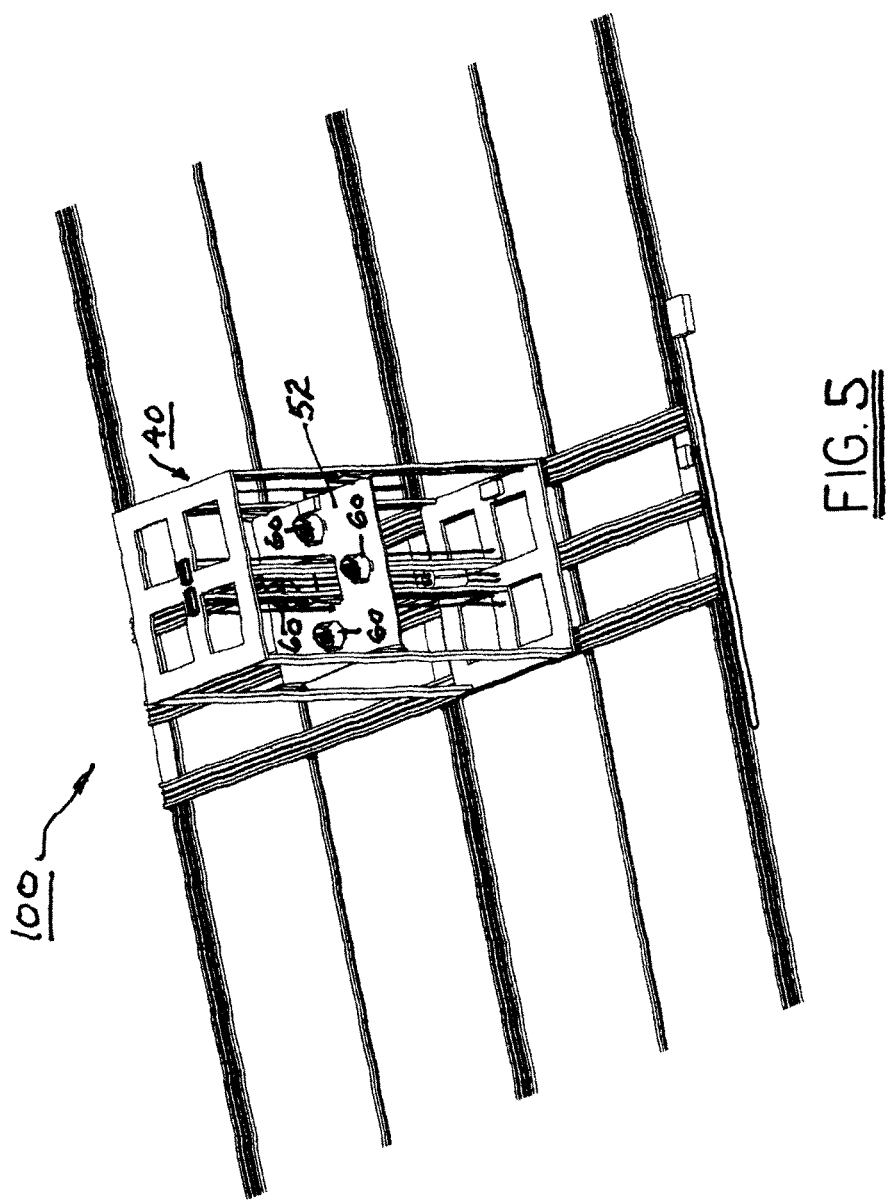
FIG. 5 is a schematic elevational view showing the addition of a plurality of gimbal assemblies to the simulator shown in FIGS. 3 and 4.
Figure 6:
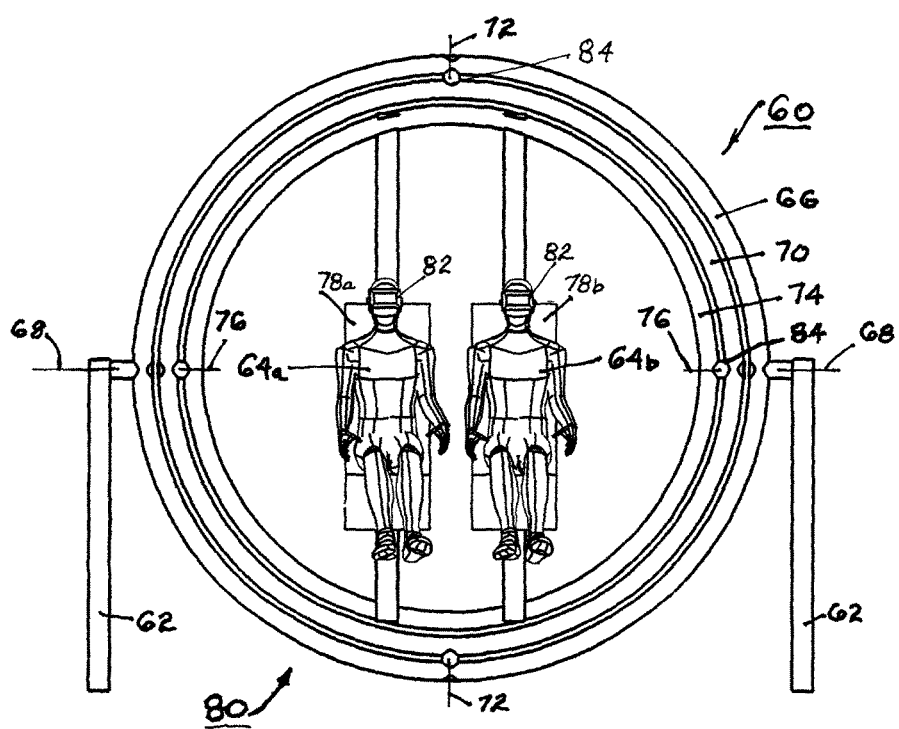
FIG. 6 is a schematic elevational drawing showing a first embodiment of an individual 3-ring gimbal assembly configured for two seated users wearing virtual reality headsets.
Figure 7:
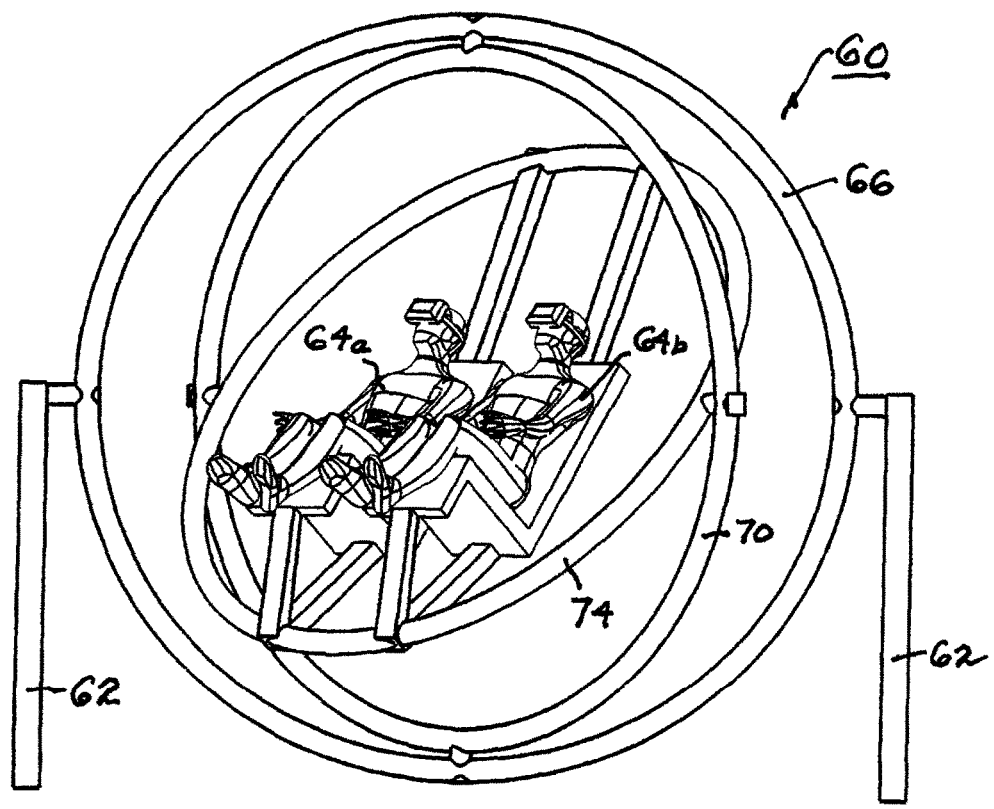
FIG. 7 is a schematic elevational drawing showing the gimbal assembly shown in FIG. 6 in motion about three intersecting axes of rotation.

Referring now to FIGS. 5 through 7, a currently preferred embodiment of a versatile translational and rotational motion simulator 100 comprises at least one gimbal assembly 60 mounted on platform 52. Preferably, a plurality of gimbal assemblies 60 are mounted on first and second mounts 62 on platform 52, as shown in FIG. 6, to accommodate a plurality of system users 64a,64b simultaneously as described above.

Gimbal assembly 60 comprises a first gimbal 66 (fifth structure) mounted on mounts 62 for controlled motorized rotation (motor not shown) about a first axis of rotation 68. A second gimbal 70 (sixth structure) is mounted within first gimbal 66 for controlled motorized rotation (motor not shown) about a second and orthogonal axis of rotation 72. A third gimbal 74 (seventh structure) is mounted within second gimbal 70 for controlled motorized rotation (motor not shown) about a third axis of rotation 76. Preferably but not necessarily, the first, second, and third axes of rotation 68,72,76 intersect at a common point in space (not shown).

Within third gimbal 74 is mounted at least one user position 78a,78b for placing a system user 64a,64b on third axis 76. Each user position 78a,78b corresponds to Point P shown in FIGS. 1 and 2. Gimbal assembly 60 defines a second electromechanical subsystem 80 for rotation of a Point P about three orthogonal rotational axes in space.

Taken together, first subsystem 41 and second subsystem 80 define a novel six-dimensional versatile translational and rotational motion simulator for real motion by a system user wherein a user can experience translation along any of three orthogonal translational axes X, Y, and Z, and the full 360° of rotation about each of three rotational axes 78,82,86 (also referred to herein as α, β and γ) independently.

Further, each user position 78a,78b is equipped with a virtual reality (VR) dedicated CPU (not shown) and a VR display device 82. A currently preferred VR display device includes a face mask worn by a user and audio ear buds or headphones, although other types of VR devices are fully comprehended by the present invention. Preferably, two side-by-side users in a single gimbal assembly may be seated on a transverse track (not shown), allowing each user to be positioned laterally such that the center of mass of the users coincides with the point of intersection of the three rotational axes. This is also useful for centering a single user of a gimbal assembly.

Gimbal assembly 60 further comprises at least one motion sensor reference device connected to power supply 50. It is not tethered to the headset. Prior art headsets may employ either of two different motion tracking techniques: one in which the standalone sensor is an optical sensor connected to the gimbal CPU, and the other is simply a reference point that emits lasers for motion sensors on the headset to pick up. It basically acts as a "lighthouse" for the headset to determine its location in space. In the latter case, the standalone sensors are not tethered to the gimbal CPU, just to the power supply. If the motion sensor reference device is connected to the CPU, it will be the same CPU that controls the GPU and, therefore, the VR headset 82, to track accurately a user's head so that when a user moves his head to look left or right or up or down the VR display in the face mask will follow the user's head motion. Tethering the CPU/GPU apparatus to VR display device 82 all within the third gimbal minimizes motion-to-photon latency to improve real-time fidelity of the user's experience.

Electrical power to the three gimbals is provided via slip rings 84 in the rotational couplings between the first and second gimbals and between the second and third gimbals.

In operation, hybrid real/virtual motion system 10 is operable to create a virtual reality experience in the mind of a user that is synchronized with a real motion experience in the body of the user along three orthogonal linear axes and three orthogonal rotational axes, defined herein as a six-dimension hybrid real/virtual motion system.

Figure 8:
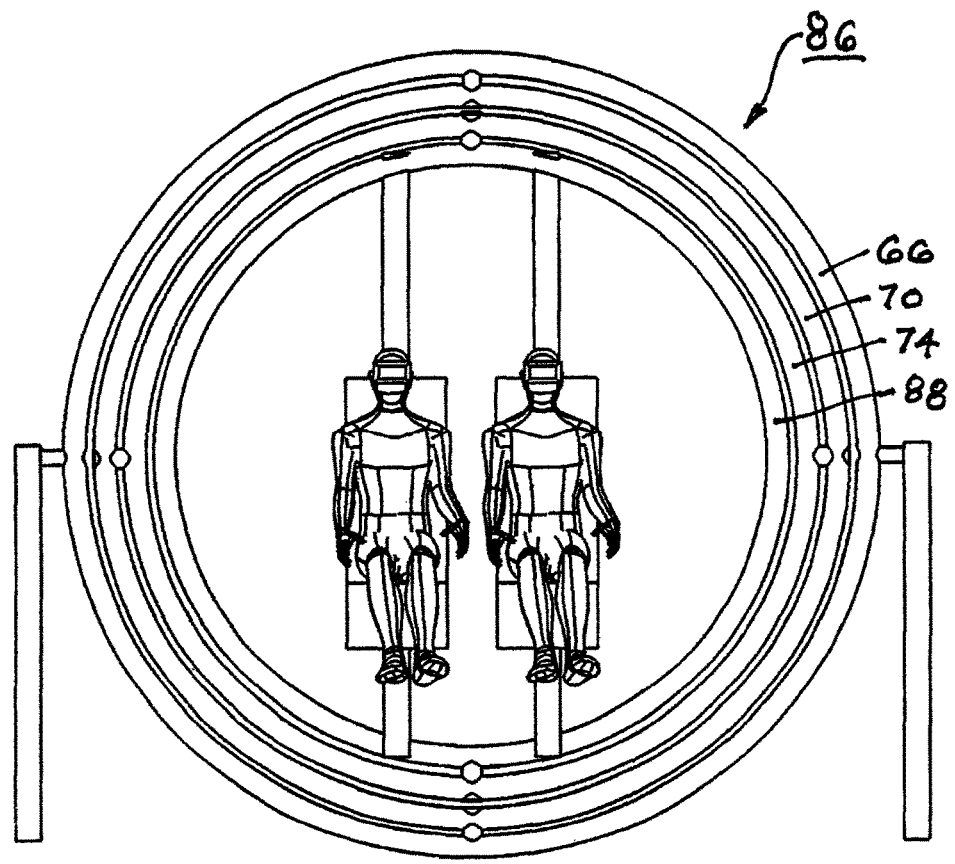
FIG. 8 is a schematic elevational drawing showing a first embodiment of an individual 4-ring gimbal assembly.

Referring now to FIG. 8, in a second embodiment 86 of a gimbal assembly in accordance with the present invention, a fourth gimbal 88 may be included in a gimbal assembly to prevent "gimbal lock", as is well known in the gimbal arts. Gimbal lock is the loss of one degree of freedom in a three-dimensional, three-gimbal mechanism that occurs when the axes of two of the three gimbals are driven into a parallel configuration, "locking" the system into rotation in a degenerate two-dimensional space. The word lock is misleading: no gimbal is restrained. All three gimbals can still rotate freely about their respective axes of suspension. Nevertheless, because of the parallel orientation of two of the gimbals' axes there is no gimbal available to accommodate rotation along one axis. This problem may be overcome by use of a fourth gimbal 88, disposed within third gimbal 74 and intelligently driven by a motor to maintain a large angle between two of the gimbal axes.

Figure 9:
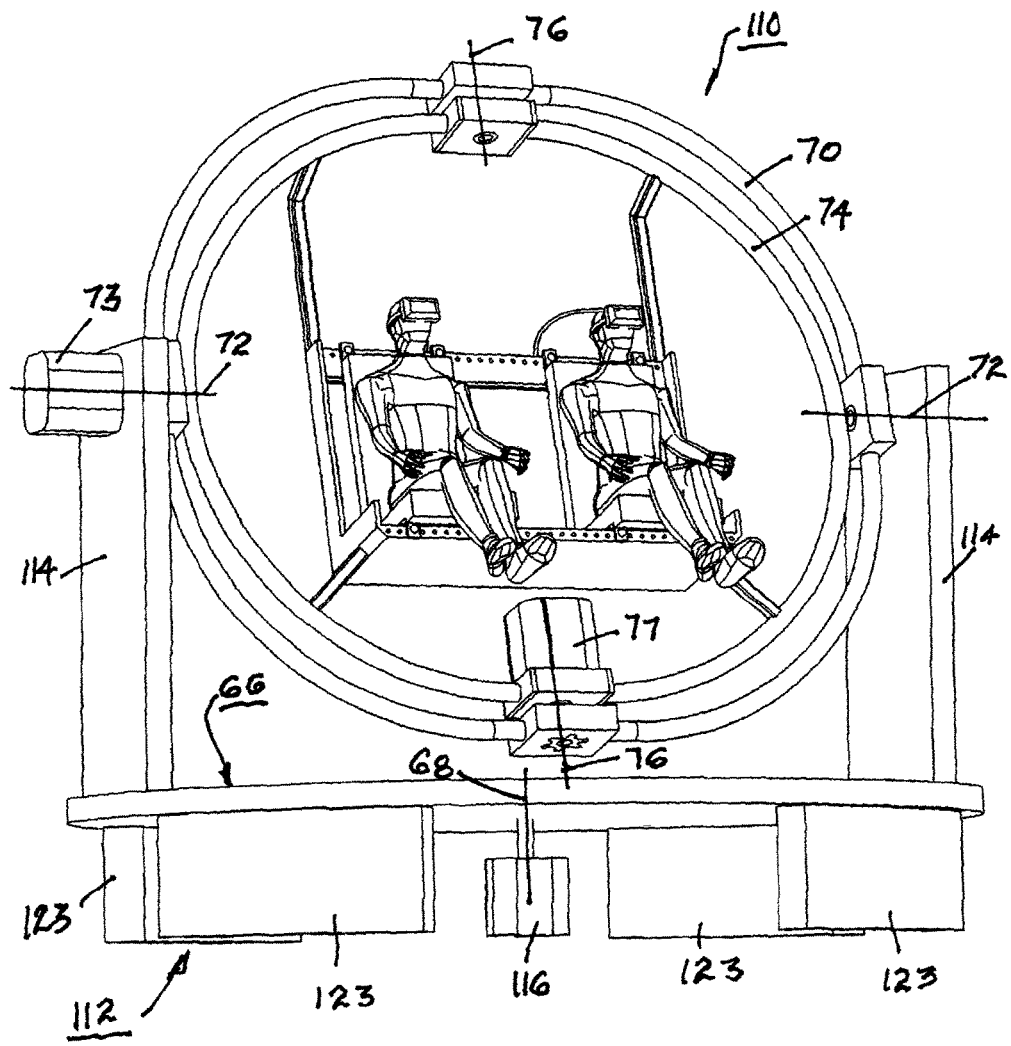
FIG. 9 is an isometric view of a second embodiment of an individual 3-ring gimbal assembly configured for two seated users wearing virtual reality headsets.

Referring now to FIG. 9, a third embodiment 110 of a gimbal assembly in accordance with the present invention is a simplified variant of first embodiment 60 (FIG. 6, wherein outer gimbal 66 is replaced by a stand assembly 112 having two supportive uprights 114 rotatable by a motor 116 about vertical axis 68 and supported by horizontal bearings 123. The housing of motor 116 is mounted to platform 52 (FIG. 5). The remainder of the gimbal assembly is substantially the same as shown in FIG. 5. Gimbal 70 is driven by motor 73 about axis 72, and gimbal 74 is driven by motor 77 about axis 76.

Figure 10:
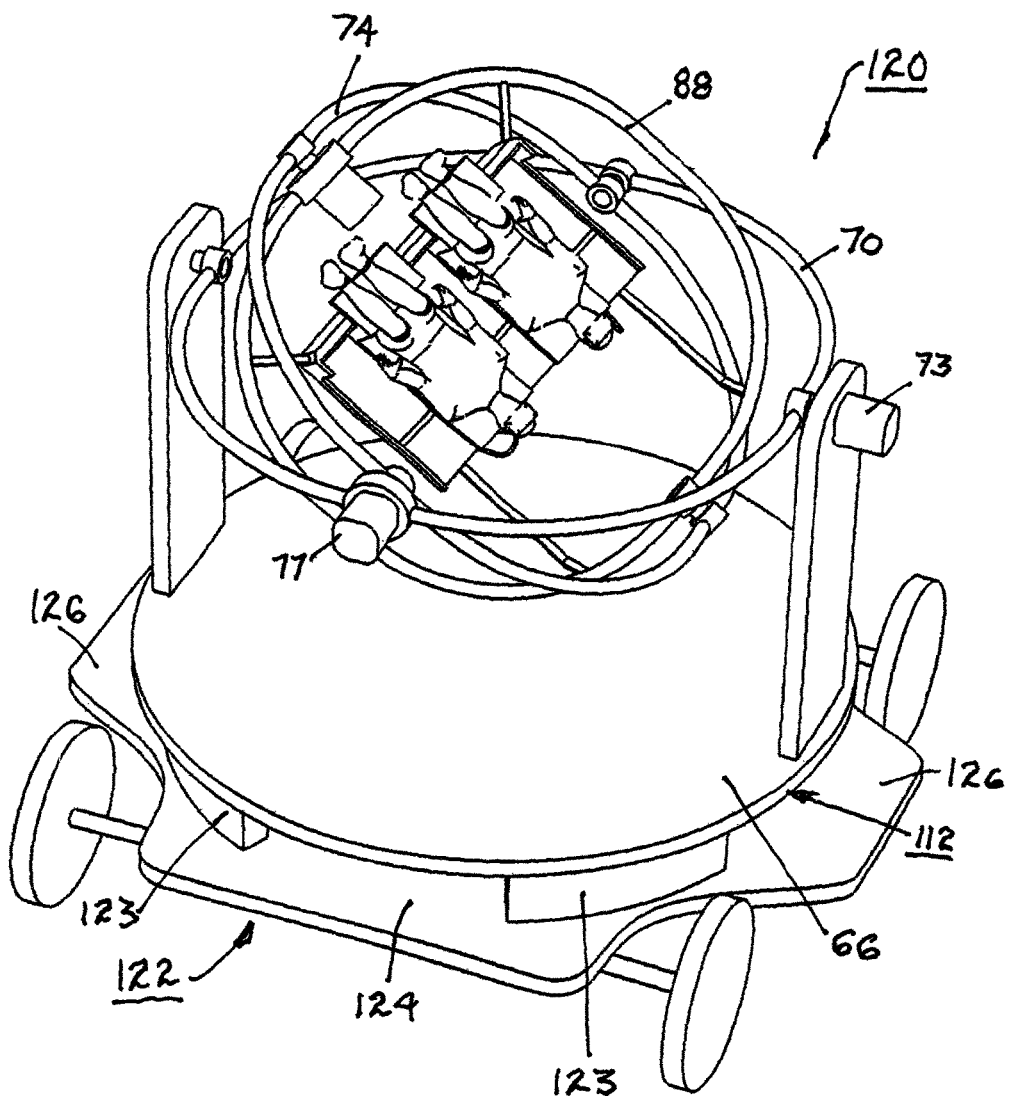
FIG. 10 is an isometric view of a second embodiment of an individual 4-ring gimbal assembly, showing a wheeled undercarriage for driving the gimbal assembly onto and off the simulator.
Figure 11:
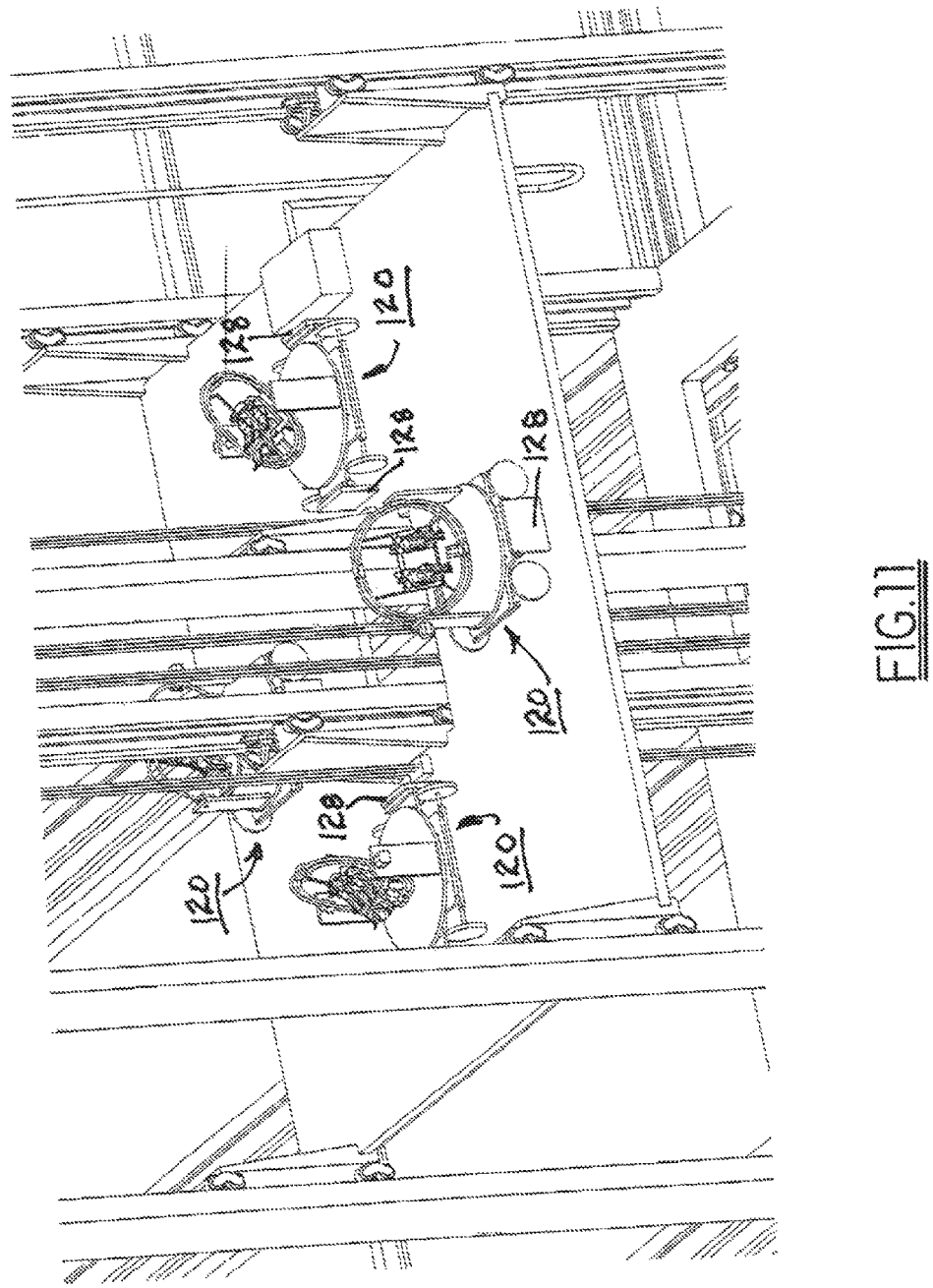
FIG. 11 is a detailed isometric view showing a plurality of wheeled embodiments of 3-ring gimbal assemblies secured by clamps to the platform of a simulator.

Referring now to FIGS. 10 and 11, a fourth embodiment 120 of a gimbal assembly in accordance with the present invention is a variant of embodiment 110 (FIG. 9) wherein the entire gimbal assembly is rotatably mounted, via horizontal bearings 123 attached to the underside of gimbal assembly 66, on a wheeled carriage 122. Motor 116 (not visible in FIG. 10) is mounted to the deck 124 of carriage 122. Carriage 122 includes first and second horizontal flanges 126 that project between wheels 128 for engagement with clamps 128 on platform 52 to secure embodiment 120 to platform 52 during operation of the simulator.

Figure 12:
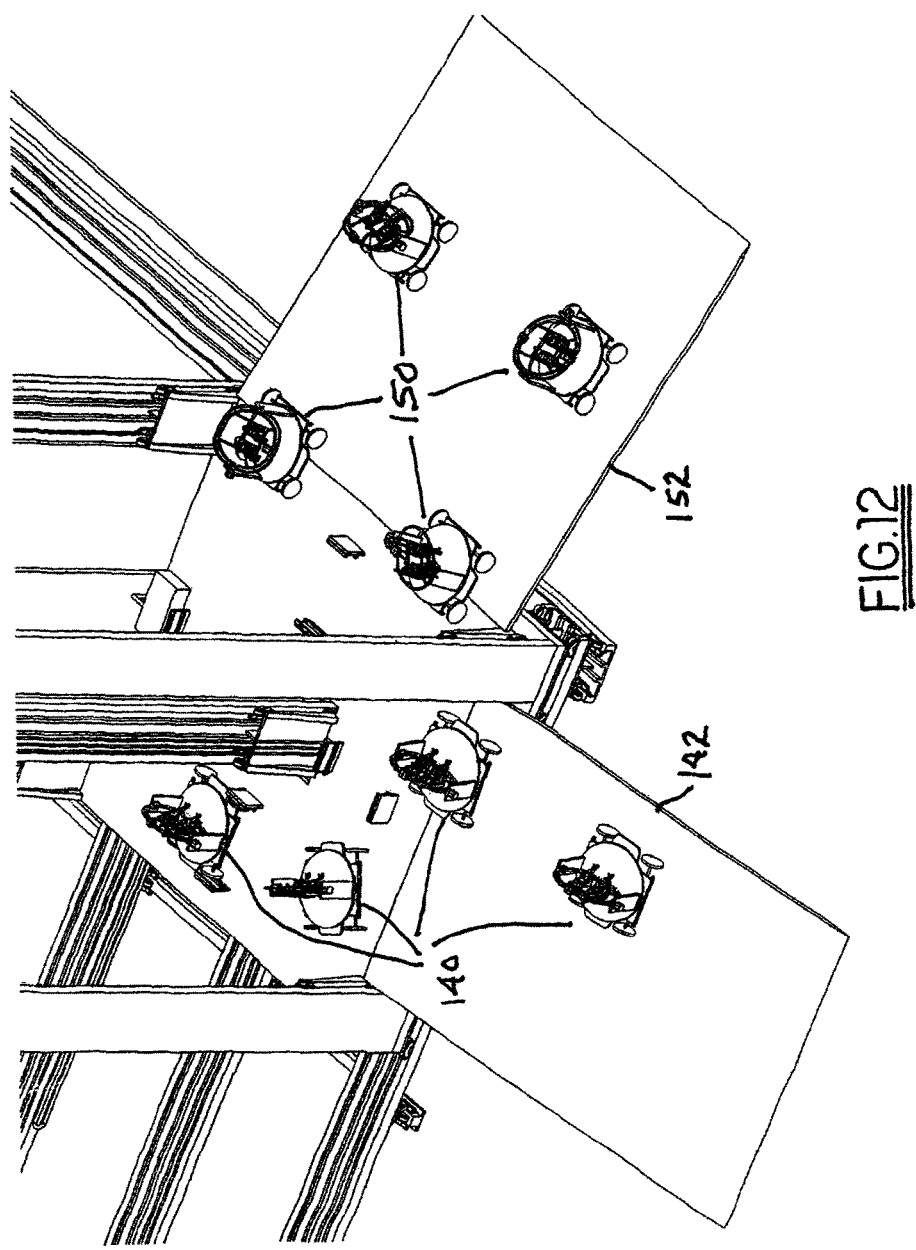
FIG. 12 is an isometric view of a step in the operation of a simulator in accordance with the present invention showing simultaneous loading and unloading of wheeled gimbal assemblies to and from the platform of a simulator via unloading and loading ramps.
Figure 13:
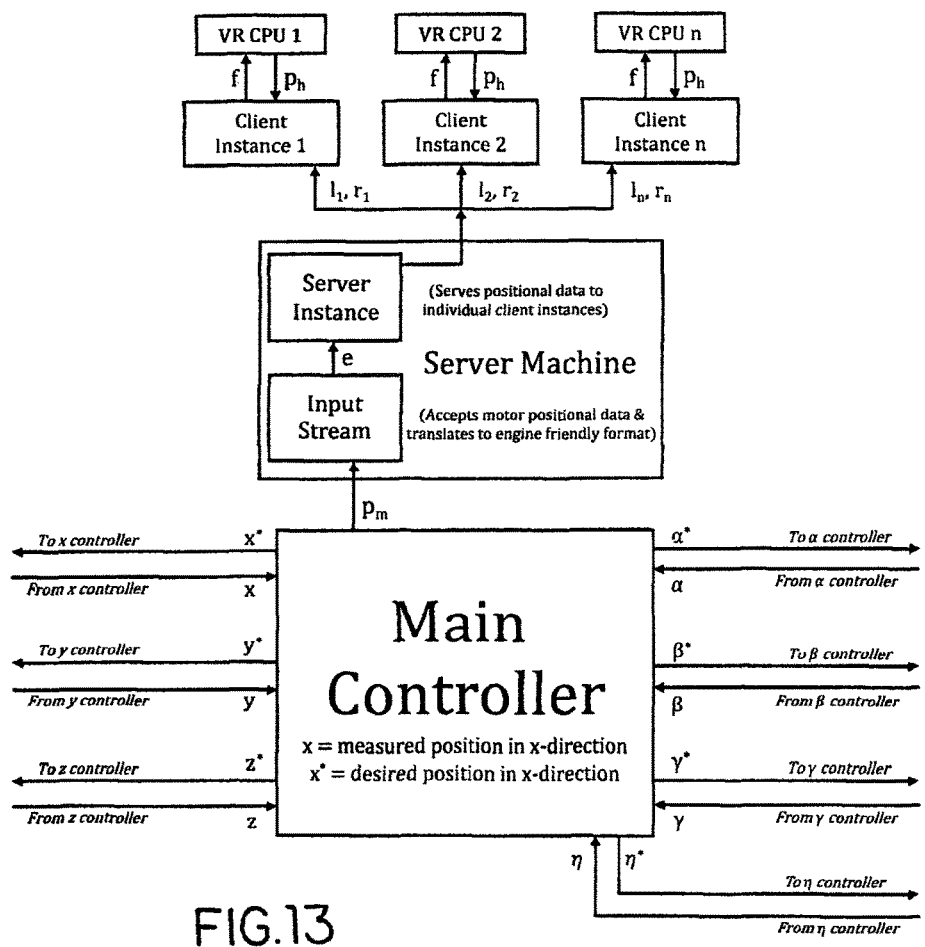
FIG. 13 is a main control scheme for operation of a versatile translational and rotational simulator in accordance with the present invention and for integrating the physical motions of one or more simulator users with the virtual reality scenes being experienced in the simulator users' minds.
Figure 14:
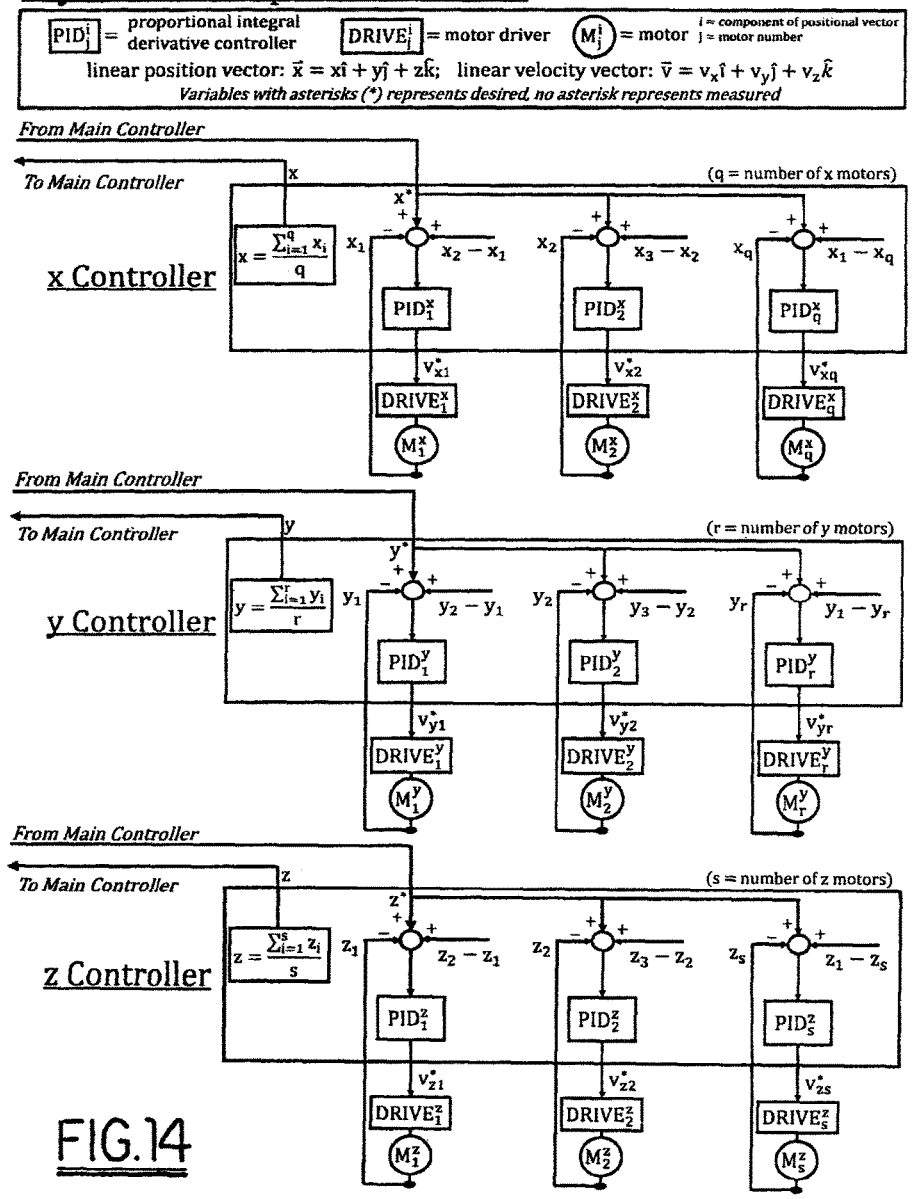
FIG. 14 is a sub-control scheme that coordinates with the main control scheme shown in FIG. 13 for controlling the linear components of the simulator.

Referring to FIG. 12, an exemplary method is shown for loading and unloading a plurality of gimbal assemblies 120 from platform 52. An important operating consideration of simulator 100 is the time required and difficulty of loading users into and out of operating position. One possible solution is to provide an extra set 150 of gimbal assemblies 120 into which users can be loaded and secured off-site (not shown) while the simulator is running on a previous ride. At changeover, the previous users in a first set 140 of gimbal assemblies are driven off platform 52 via removable ramp 142, for passengers to be discharged off-site and the gimbal assemblies reloaded with new users, while the next set of users in a second set of gimbal assemblies is being driven onto platform 52 via removable ramp 152 and clamped into place.

Referring now to FIGS. 13-16, a Main Controller drives the motors within the physical environment. The Server Machine drives the virtual environment. Both the Main Controller and the Server Machine are preloaded with the position vs. time data (assuming non-real-time motor control). In the case of motion control, the Main Controller would take an analog input signal corresponding to a desired acceleration and convert it to control variables for the motors.

The Main Controller sends and receives positional data to and from the controller for each set of motors corresponding to a degree of freedom. The Main controller also sends the physical position of each individual motor set ($p_m$) to the Serve Machine. All motor controllers in this invention use a feedback loop to maintain positional accuracy at a high sampling rate, and they all work the same way. For the motor controller in the x-direction described in FIG. 14, the Main Controller sends the desired position in the x-direction (x*). The x Controller takes x* and sends it to the proportional integral derivative controller (PID) for each motor. For the first linear motor in the x-direction ($M_1$), the $PID_1$ calculates the required velocity based on the desired position, x*, the actual position measured by the encoder, $x_1$, and the offset between $M_1$ and $M_2$ ($x_2$-$x_1$). This offset is calculated between adjacent motors, and the last one is compared to the first. This ensures that all motors operating in the same degree of freedom remain aligned. After $PID_1$ calculates the velocity required to obtain the desired position (v*), it is sent to $DRIVE_1$. $DRIVE_1$ provides the necessary voltage and current levels for $M_1$ to carry out the operation effectively. An encoder installed on the $M_1$ feeds $x_1$ back to the x Controller. The average (x) of $x_1$, $x_2$, . . . , and $x_q$ where q equals the number of motors operating in the x-direction is sent back to the Main Controller. The operation for the controllers of the other degrees of freedom is the same. In the case of the gimbal motor controllers in FIGS. 15 and 16, a maximum of two motors per degree of freedom is possible, whereas there can be an infinite number of linear motors controlling one degree of freedom. Also, the η degree of freedom is only required for a four-gimbal assembly.

The Main Controller sends the current position ($p_m$) of each motor to the Server Machine. The Input Stream accepts the motor positional data and translates it to a virtual engine friendly format (e). The engine friendly variables get sent to the Server Instance where it uses e to determine the proper virtual orientation which may differ from rider to rider depending on their individual virtual experience. The virtual experience does not have to be the same for all users riding at the same time, and the physical rotational motion may differ as well. However, the physical linear motion is the same for all users at any given time. Additionally, if a gimbal assembly has more than one rider, their rotational velocities will differ depending on the position of their seat. Although the real linear motion of all riders is the same, they can have different virtual linear motion. This is because the riders can be tricked into going virtually faster or slower than they are physically. Thus, a 1:1 synchrony of virtual to physical motion is not necessary in all cases. The same is true for rotational motion, and therefore $l_n$ and $r_n$ can differ between riders. The Server Machine runs on the same clock as the Main Controller, and they both can perform a feedback loop to determine if the motors (for the Main Controller) or virtual environment (for the Server Machine) need to speed up or slow down to maintain synchrony. Based on the gimbal assembly and seat each person is sitting in, the Server Machine sends the positional data to the individual CPUs on each gimbal assembly. Each Client Instance sends a client specific frame to the VR headset to be viewed by the user accompanied with audio via headphones. The positional data of the rider's head, hands, and whatever object being tracked can be sent back to the Client Instance to recalculate the client specific frame.

An important use of a simulator in accordance with the present invention is to reproduce real-world trips through time and space. By mounting an accelerometer, gyroscope, other inertial measurement unit (IMU) or any combination thereof to any moving object, the rotational and translational motion of the object can be measured and recorded in real-time. The data from these sensors can be mathematically split up into three-dimensional constituents and used to control all sets of motors within the motion simulator to exactly reproduce the original motion with high fidelity. Some examples of potential moving objects to be recorded and later simulated include, but are not limited to, cars, jet skiis, skydivers, airplanes, and dune buggies.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatus, and methods can be practiced with fewer than the mentioned certain number of elements. Also, while a number of particular embodiments have been described, it will be understood that features and aspects that have been described with reference to each particular embodiment can be used with each remaining particularly described embodiment.

What is claimed is:

1. A combined translational and rotational motion simulator operable to combine a visual graphic synchronized with real motion of a user along a prescribed real path of motion in space corresponding to a virtual path of motion displayed to said user in said visual graphic, comprising:
   a) a first translational apparatus fixed to a surface and operable to translate said user in a first linear direction;
   b) a second translational apparatus disposed on said first apparatus and operable to translate said user in a second linear direction different from said first linear direction;
   c) a third translational apparatus disposed on said second apparatus and operable to translate said user in a third linear direction different from said first and second linear directions;
   d) a fourth apparatus disposed on said third translational apparatus operable to support said user throughout said first, second, and third linear translations, and together with said first, second, and third translational apparatuses defining a translational motion assembly;
   e) a first rotational apparatus disposed on said fourth apparatus and having a first axis of rotation;
   f) a second rotational apparatus disposed within said first rotational apparatus and having a second axis of rotation different from said first axis of rotation;
   g) a third rotational apparatus disposed within said second rotational apparatus and having a third axis of rotation different from said first and second axes of rotation, and together with said first and second rotational apparatuses defining a first rotational motion assembly capable of rotation through more than 360° in at least two of said rotational directions;
   h) at least one user occupancy position disposed within said third rotational apparatus;
   i) a fifth apparatus containing visual displays and audio speakers operable to create a virtual reality scene visible to said user;
   j) a sixth apparatus containing microelectronics operable to supply graphical processing power to said fifth apparatus; and
   k) a control sub-system, including at least one programmable controller, operationally connected to said first translational apparatus, said second translational apparatus, said third translational apparatus, and said fourth apparatus to control said linear motion assembly in said first, second and third linear directions, and operationally connected to said first rotational apparatus, said second rotational apparatus, and said third rotational apparatus to control said rotation in said first, second, and third rotational directions, and operationally connected to said sixth apparatus to ensure real and virtual motion synchronization.

2. A combined translational and rotational motion simulator in accordance with claim 1, wherein said first translational apparatus includes a first motor selected from the group consisting of linear synchronous, linear induction, rotary, and hydraulic.

3. A combined translational and rotational motion simulator in accordance with claim 1, wherein said second translational apparatus includes a second motor selected from the group consisting of linear synchronous, linear induction, rotary, and hydraulic.

4. A combined translational and rotational motion simulator in accordance with claim 1, wherein said third translational apparatus includes a third motor selected from the group consisting of linear synchronous, linear induction, rotary, and hydraulic.

5. A combined translational and rotational motion simulator in accordance with claim 1, wherein said first translational apparatus and said second translational apparatus allow said fourth apparatus to occupy respective first and second horizontal spatial dimensions and said third translational apparatus allows said fourth apparatus to occupy a vertical spatial dimension.

6. A combined translational and rotational motion simulator in accordance with claim 1, wherein said fourth apparatus further comprises a horizontal platform supportive of said first rotational motion assembly.

7. A combined translational and rotational motion simulator in accordance with claim 1 further comprising a plurality of said user occupancy positions within said third rotational apparatus.

8. A combined translational and rotational motion simulator in accordance with claim 1 further comprising a plurality of said rotational motion assemblies disposed on said fourth apparatus.

9. A combined translational and rotational motion simulator in accordance with claim 8 further comprising a plurality of said virtual reality assemblies disposed on said fourth apparatus.

10. A combined translational and rotational motion simulator in accordance with claim 1 wherein said prescribed real path of motion in space may be changed to a different prescribed real path of motion in space by reprogramming said at least programmable controller.

11. A combined translational and rotational motion simulator in accordance with claim 1 wherein said at least one programmable controller and said sixth apparatus are operable to synchronize real motions of each component of said translational motion and rotational motion assemblies with virtual motions of said virtual reality motion experience.

12. A combined translational and rotational motion simulator in accordance with claim 1 capable of seven degrees of freedom by further comprising a fourth rotational apparatus disposed within said third rotational apparatus,
- wherein said first, second, third, and fourth rotational apparatuses define a second rotational motion assembly capable of rotating a user about any of the three spatial dimensions simultaneously, and
- wherein said rotating may be begun instantaneously about any of the said three spatial dimensions at any time.

13. A combined translational and rotational motion simulator in accordance with claim 1 wherein at least one of said first, second, and third translational apparatuses comprises at least one linear motor.

14. A combined translational and rotational motion simulator in accordance with claim 1 wherein said first, second, and third rotational apparatuses comprise first, second, and third motorized gimbals defining a gimbal assembly.

15. A combined translational and rotational motion simulator in accordance with claim 12 wherein said first, second, third, and fourth rotational apparatuses define a second rotational motion assembly.

16. A combined translational and rotational motion simulator in accordance with claim 14 comprising a plurality of said gimbal assemblies.

17. A combined translational and rotational motion simulator in accordance with claim 16 wherein at least one of said gimbal assemblies is removably disposed on said fourth apparatus.

* * * * *